United States Patent
Weaver et al.

(10) Patent No.: US 6,302,136 B1
(45) Date of Patent: Oct. 16, 2001

(54) STEAM VALVE

(75) Inventors: Billy Lee Weaver, Eagan, MN (US);
Michael R. Woiak, Houlton, WI (US);
Timothy N. Booth, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/884,059

(22) Filed: Jun. 27, 1997

(51) Int. Cl.[7] .................................................. F16T 1/38
(52) U.S. Cl. ......................... 137/183; 137/185; 137/192; 251/368
(58) Field of Search .................................. 137/183, 185, 137/192; 251/368

(56) References Cited

U.S. PATENT DOCUMENTS

| | | |
|---|---|---|
| 3,683,965 * | 8/1972 | McClure et al. ............... 251/368 X |
| 3,720,223 | 3/1973 | Goellner . |
| 3,807,429 | 4/1974 | Breton . |
| 4,149,557 | 4/1979 | Keech et al. . |
| 4,161,187 * | 7/1979 | Bauer ............................ 251/368 X |
| 4,226,362 | 10/1980 | Föller . |
| 4,275,755 | 6/1981 | Föller et al. . |
| 4,295,605 | 10/1981 | Clayton et al. . |
| 4,300,588 | 11/1981 | Fujiwara et al. . |
| 4,408,626 | 10/1983 | Fujiwara . |
| 4,427,149 | 1/1984 | Adachi . |
| 4,511,593 | 4/1985 | Brandolf . |
| 4,598,861 | 7/1986 | Föller . |
| 4,616,778 | 10/1986 | Thieme . |
| 4,620,913 | 11/1986 | Bergman . |
| 4,679,727 | 7/1987 | Alesson . |
| 4,681,256 | 7/1987 | Dewhirst . |
| 4,723,704 | 2/1988 | Muramoto . |
| 4,736,886 | 4/1988 | Oike . |
| 4,792,090 | 12/1988 | Dewhirst . |
| 5,065,785 | 11/1991 | Deacon et al. . |
| 5,082,237 | 1/1992 | Ayvaz . |
| 5,085,671 | 2/1992 | Martin et al. . |
| 5,141,018 | 8/1992 | Guterman . |
| 5,222,521 | 6/1993 | Kihlberg . |
| 5,275,334 | 1/1994 | Yumoto . |
| 5,287,878 | 2/1994 | Oike . |
| 5,378,501 | 1/1995 | Foster et al. . |
| 5,441,235 | 8/1995 | Narasimhan et al. . |
| 5,458,754 | 10/1995 | Sathrum et al. . |
| 5,478,012 | 12/1995 | Fujiwara et al. . |
| 5,633,094 | 5/1997 | Takeshima et al. . |

OTHER PUBLICATIONS

Brochure for CeraMc™ balls and seats in McCannaseal® Valves, McCanna, Inc., Carpentersville, IL, Bulletin No. V–512; copyright 1990; 2 pages.

"Steam Utilization Course"; Spirax Sarco, Inc.; Allentown, PA; copyright 1995; 89 pages.

"Industrial Steam Trapping Handbook"; Yarway Corporation; copyright 1984; 126 pages.

"Advanced ION Bond® Coatings"; Multi–Arc Inc.; Rockaway, NJ; copyright 1996; 6 pages.

"Installation of Pressure Change Assembly for Armstrong Inverted Bucket Steam Traps"; Armstrong Inc.; Three Rivers, Michigan; Oct. 1992; 2 pages.

* cited by examiner

Primary Examiner—Gerald A. Michalsky
(74) Attorney, Agent, or Firm—Gregory D. Allen; Scott R. Pribnow (57) ABSTRACT

Steam valve wherein at least one of the valve plug mating surface or valve seat mating surface has a metal nitride and/or carbide coating thereon. Preferably, the metal nitride and/or carbide coating is on both mating surfaces.

14 Claims, 4 Drawing Sheets

STEAM VALVE

FIELD OF THE INVENTION

The present invention relates to steam valves having a valve plug or valve seat which have coated thereon a metal nitride and/or metal carbide coating.

DESCRIPTION OF RELATED ART

Steam is commonly transported under pressure (e.g., 35 kPa to 4200 kPa (5 psi to 600 psi)) through a pipe or tunnel system as a way to move energy from one location to another. Such energy is used, for example, for heating, drying, cooking, manufacturing processes, curing, or driving a turbine. In transporting the steam, at least some condensate or liquid water is usually formed. The condensate interferes with the efficient transport and heat transfer of the steam, particularly through a pipe. Steam valves are therefore commonly used to remove condensate from steam transport systems. Generally, such valves allow condensate to be released from the steam system, while preventing, or at least minimizing, the loss of steam during condensate release.

Steam valves typically are comprised of a conduit comprising a first opening (i.e., an inlet), a second opening (i.e., an outlet) and a passageway therethrough for (steam) fluid flow between the openings, the passageway including a valve plug and a valve seat, wherein the valve plug is movable relative to the valve seat between an "open" position where steam and condensate can pass through the passageway to the outlet for discharge, and a "closed" position where steam and condensate cannot pass through the passageway. Ideally, the steam valve allows condensate to flow through the passageway and to be discharged, while not allowing steam to pass through the passageway. Steam valves are frequently referred by the type of mechanism used to move or actuate the valve plug. Examples of steam valves include thermodynamic valves (e.g., disc valves), mechanical valves (e.g,., closed float valves, inverted bucket valves, and open bucket valves), and thermostatic valves (e.g., bimetallic valves, bellows valves, and liquid expansion valves).

Poor or defective operation of a steam valve(s) can lead to a substantial waste of energy, which in turn can lead to a substantial waste of money and natural resources. For example, as discussed in "Industrial Steam Trapping Handbook," Yarway Corp., 1984, page 3, if 10% of the valves in a 6,000 steam valve system do not close after the condensate has been released, and 9.1 kg (20 pounds) of steam is lost per (non-closed) valve per hour, then 131,000 kg (288,000 pound) of steam per day is lost. If the cost of steam is about $11.00/kg (about $5.00/lb.), then approximately $525,000 of steam is lost (and wasted) from the system per year.

The general mechanical nature of steam valves makes them prone to wear and deterioration. A significant factor contributing to the shortened service life of a valve is typically corrosion. In addition to the steam, which is hot (about 100° C. or greater), water vapor, corrosive materials (e.g., carbonic acid is formed in steam systems from the reaction of $CO_2$ (e.g., from air) with water) and/or other contaminants (e.g., dirt, corrosion products, and sealants from the repair of leaky joints) are also frequently present. Another factor affecting service life of a valve is mechanical stress, which is due, for example, to repeated contacting of the valve plug and valve seat during the opening and closing of the valve. In many common steam systems, valves open and close several times per second.

Wear and deterioration of valves is generally most prevalent with the valve plug and valve seat. Typical steam pressures and velocities through steam pipes range from about 35 kPa to about 4200 kPa (5 psi to 600 psi) and about 145 km/hr to about 644 km/hr (90 miles/hr–400 miles/hr), respectively. The condensate (i.e., water droplets, which may include corrosive and/or other materials) can impact surfaces of the valve at significant velocities, further enhancing corrosion. Corrosion (e.g., resulting in pitting) of valve plug and valve seat surfaces which contact each other when the valve is closed are particularly troublesome. Such corrosion leads to an inability of the valve plug to properly couple with the valve seat and seal against or prevent passage of steam through the valve.

One approach to addressing the wear problem has been to harden (i.e., metallurgical hardening) the valve seats. Although hardening may reduce valve seat wear, the hardened valve seat may be more brittle, and hence more prone to fracture from repeated contact between the valve seat and valve plug.

One approach to addressing the corrosion problem has been to carefully monitor and control the boiler feed water in order to minimize contaminants (e.g., gases such as carbon dioxide) (see, e.g., "Industrial Steam Trapping Handbook", Yarway Corp., Blue Bell, Pa., 1984, pp.11–12.). Although carbon dioxide is not itself corrosive, when combined with free hydrogen, (corrosive) carbonic acid can be formed.

Another approach to the corrosion problem has been to make components of the valve from more corrosion resistant materials such as stainless steel (see, e.g., "Industrial Steam Trapping Handbook," supra) or carbide (containing tungsten carbide as the major hard constituent in a binder consisting mainly of cobalt and nickel) (see, e.g., U.S. Pat. No. 4,408, 626 Fujiwara).

Still another approach to the corrosion problem has been to replace corroded or damaged components (e.g., the valve plug and valve seat) of the steam valve. Parts to repair or rebuild corroded or damaged steam valves are sold together, for example, as steam valve repair kits. For example, a repair kit for an inverted bucket steam valve typically contain a valve lever assembly (including a valve lever and plug), a valve seat, a guide pin assembly, and mounting hardware.

Although attempts have been made to address the corrosion problem, other solutions may be desirable.

SUMMARY OF THE INVENTION

The present invention provides a steam valve comprising:

(a) a conduit comprising a first opening, a second opening, and a passageway therethrough for steam fluid flow between the openings, the passageway including a valve seat that includes a valve seat mating surface; and (b) a valve plug including a major surface which includes a valve plug mating surface, at least one of the valve plug or valve seat being moveable relative to the other (preferably, the valve plug is moveable relative to the valve seat) between at least a first position and a second position;

wherein in the first position the mating surfaces cooperate to substantially prevent flow of steam fluid through the passageway from the first opening to the second opening, and wherein in the second position the mating surfaces are positioned relative to each other to allow steam fluid to flow from the first opening to the second opening through the passageway, and wherein at least one of the mating surfaces has thereon at least one of a metal nitride or a metal carbide coating (wherein such language is intended to include combinations of metal carbide and metal nitride coatings). The term "steam fluid" refers to water vapor (steam), and/or liquid water (condensate) in a steam system, and optionally includes dissolved and/or undissolved gasses (e.g., $CO_2$ and $O_2$), reaction products (e.g., carbonic acid), and/or other contaminants that are typically found in high pressure steam systems. Preferably, both the valve plug mating surface and the valve seat mating surface have the metal nitride and/or metal carbide coating thereon.

Preferred metal nitride coatings include coatings of titanium nitride (TiN), chromium nitride (CrN), zirconium nitride (ZrN), titanium-aluminum nitride (TiAlN), aluminum-titanium nitride (AlTiN), and titanium carbide-nitride (TiCN). Preferred metal carbide coatings include coatings of tungsten carbide (WC), hafnium carbide (HfC), silicon carbide (SiC).

In another aspect, the invention provides a steam valve repair kit comprising:

(a) a (steam) valve plug including a major surface which includes a valve plug mating surface, and (b) a (steam) valve seat including a valve seat mating surface for mating with the valve plug mating surface, wherein at least one of the mating surfaces has thereon at least one of a metal nitride or metal carbide coating.

Steam valves according to the present invention have an increased service life, typically a significantly increased service life, over conventional comparable steam valves. In other words, a steam valve according to the present invention, having the metal nitride and/or carbide coating, typically has a longer service life than the same steam valve without the metal nitride or carbide coating. The metal nitride and/or carbide tends to significantly reduce the deterioration (e.g., corrosion) of the metal steam valve surface such coating is on.

BRIEF DESCRIPTION OF THE DRAWING

The invention may be more easily understood in reference to the drawing. In the drawing.

DETAILED DESCRIPTION OF PREFERRED EMBODIMENTS

Preferred steam valves according to the present invention include self-actuated steam valves, such as thermodynamic-type valves (e.g., disc valves), mechanical-type valves (e.g., closed float valves, inverted bucket valves, open bucket valves), and thermostatic-type valves (e.g., bimetallic valves, bellows valves, and liquid expansion valves).

In general, these three types of steam valves typically operate as follows. Thermostatic steam valves function via identification of steam and condensate by a thermostatic, valve-carrying element. Condensate cools below the steam temperature before it is allowed to pass through the valve to be released. Mechanical steam valves function by sensing the difference in density between steam and condensate. Movement of a "float" or a "bucket" operates a valve which when open allows steam fluid to pass therethrough. Operation of thermodynamic valves is based on the difference in kinetic energy or velocity between steam and condensate flowing through the valve. Steam valves may also be opened and closed to control the flow of steam fluid by an operator, for example, manually (e.g., manually turning a knob or wheel attached to a valve stem), electronically, pneumatically, or otherwise moving the valve plug and/or the valve seat relative to each other.

Exemplary Inverted Bucket-Type Actuated Steam Valve

Figure 1:
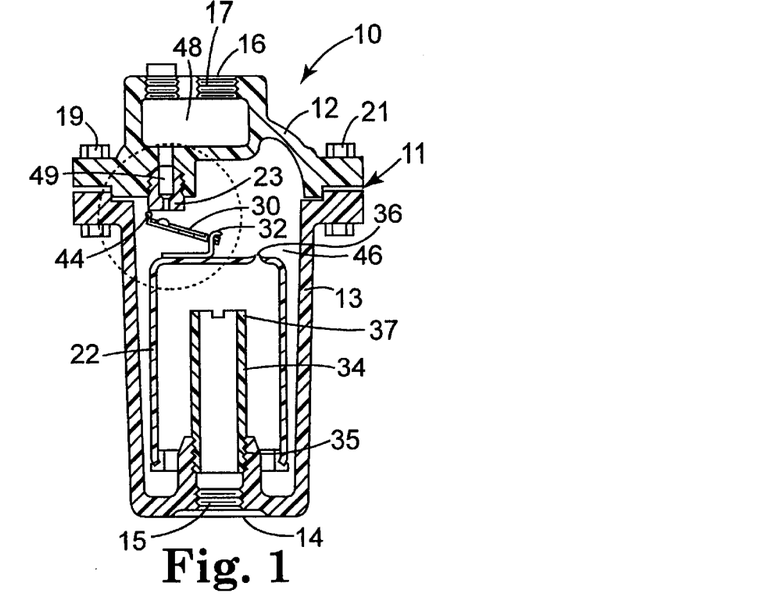
FIG. 1 is a longitudinal cross-section of an inverted bucket-type actuated steam valve according to the present invention.
Figure 2:
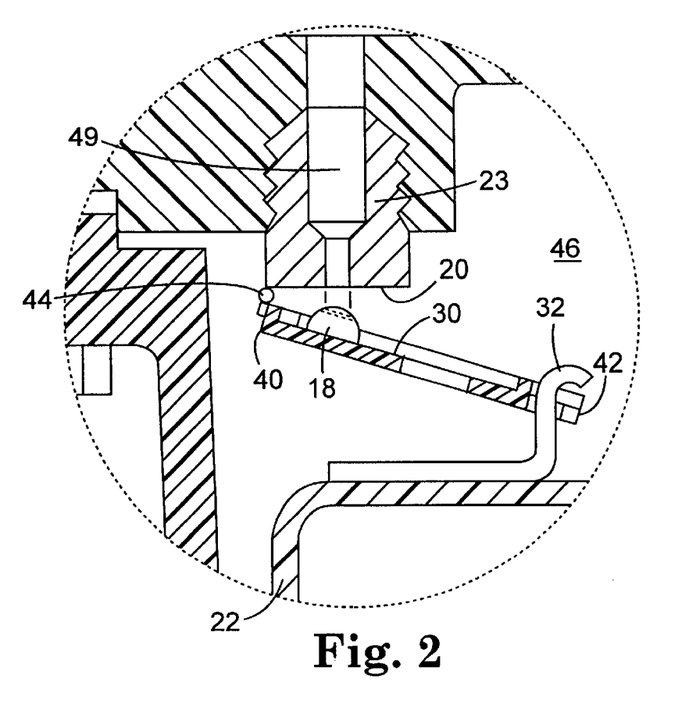
FIG. 2 is an enlarged longitudinal cross-sectional view of a portion of the inverted bucket-type actuated steam valve shown in FIG. 1.
Figure 3:
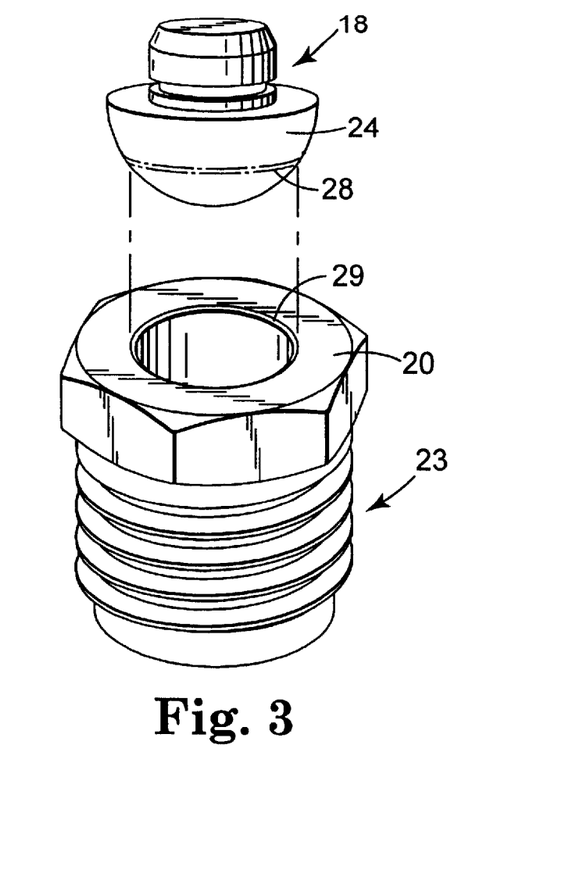
FIG. 3 is an enlarged perspective view of the valve plug and valve seat from the inverted bucket-type actuated steam valve shown in FIG. 1.

Referring to FIGS. 1–3, an exemplary inverted bucket-type actuated steam valve according to the present invention is shown. Actuated steam valve 10 comprises casing 11 having top portion 12, and bottom portion 13 held together by bolts 19 and 21. Casing 11 includes first cavity 46, second cavity 48, and inlet 14 and outlet 16 each having threaded areas 15 and 17, respectively for connection to piping (not shown). Valve seat 23, which is threaded into top casing 12, has major surface 20, and valve orifice channel 49. First cavity 46 and second cavity 48 are in communication via valve orifice channel 49.

Tube 34, which has first end 35 and second end 37, is threaded into casing bottom portion 13 such that first end 35 is open to inlet 14. Second end 37 of tube 34 is open to first cavity 46 on the underside of inverted bucket 22. Tube 34 serves to direct steam fluid entering through inlet 14 to the underside of inverted bucket 22.

Lever 30, which has first end 40 and second end 42, is pivotably connected at end 40 to valve seat 23 by hanger 44. Lever end 42 engages hook 32 to provide a pivotable connection to inverted bucket 22. Valve plug 18, which is attached to lever 30, is positioned on lever 30 such that when the lever is pivoted upward on hanger 44, valve plug 18 moves toward valve seat 23.

Pivotal movement of lever 30 on hanger 44 is provided by inverted bucket 22. Upward movement of inverted bucket 22 within cavity 46 causes pivotal movement of lever 30 which in turn causes valve plug 18 to move toward valve seat 23. In a "closed" position valve plug 18 is positioned relative to valve seat 23 such that steam fluid cannot pass through valve orifice channel 49 between valve cavity 46 and valve cavity 48. Downward movement of inverted bucket 22 within cavity 46 causes pivotal movement of lever 30 causing valve plug 18 to move away from valve seat 23. This defines an "open" position of valve 10 in which steam fluid can pass through valve orifice channel 49 between valve cavity 46 and valve cavity 48.

Structure that defines the conduit comprising the first and second openings and passageway therethrough may vary from valve to valve. For steam valve 10, the passageway is from inlet 14, through tube 34, through valve cavity 46 (optionally via vent hole 36), through valve orifice channel 49, through valve cavity 48, and then to outlet 16.

Under normal operating conditions, valve cavity 46 is filled with steam fluid supplied, for example, from a high pressure steam system (not shown) connected to inlet 14. Steam entering inlet 14 flows through tube 34 to the underside of inverted bucket 22. Steam fluid in the form of liquid water (condensate) collects and fills first cavity 46. Initially, valve 10 is in an "open" position, inverted bucket 22 being at the bottom of cavity 46, and valve plug 18 being separated from valve seat 23. If the steam fluid entering valve 10 is predominately in the form of condensate, the condensate fills cavity 46 both inside and outside of inverted bucket 22, with valve 10 remaining in an "open" position. In an "open" position, condensate flows from first cavity 46 through valve orifice channel 49 into second cavity 48. When second cavity 48 is filled, the condensate is discharged through outlet 16. While in an "open" position, small amounts of vapor, air, or non-condensable gases entering through inlet 14 can be discharged from inverted bucket 22 through vent hole 36.

Steam (vapor) which enters at inlet 14 causes inverted bucket 22 to fill with steam, displacing condensate. Once filled with steam to a predetermined level, inverted bucket 22 becomes buoyant and floats upward within cavity 46. The upward movement of inverted bucket 22 pivots lever 30 on hanger 44 causing valve plug 18 to be positioned relative to valve seat 23 such that steam fluid cannot pass through valve orifice channel 49 between valve cavity 46 and valve cavity 48. In this "closed" position steam fluid discharge of steam fluid from valve 10 is prevented.

Steam (vapor) within inverted bucket 22 can slowly pass out through vent hole 36. If the steam (vapor) is not replaced with steam (vapor) entering through inlet 14 inverted bucket 22 will sink causing valve plug 18 to separate from valve seat 23 thereby opening valve orifice channel 49 to allow steam fluid to be discharged through outlet 16.

Referring now to FIG. 3, valve plug 18 has hemispherical major surface 24 which includes annular shaped valve plug mating surface 28. Annular shaped valve plug mating surface 28 includes that portion of major surface 24 which cooperates with, typically contacts, valve seat 23 when valve 10 is in a "closed" position. Valve seat 23 has corresponding annular valve seat mating surface 29. In an actuated steam valve according to the present invention at least one of valve plug mating, surface 28, or valve seat mating surface 29 (preferably valve plug major surface 24) has at least one of a metal nitride or metal carbide coating thereon. Preferably, valve plug major surface 24 has at least one of a metal nitride or metal carbide coating thereon. Most preferably, valve plug major surface 24 and valve seat mating surface 29 has at least one of a metal nitride or a metal carbide coating thereon.

Figure 4:
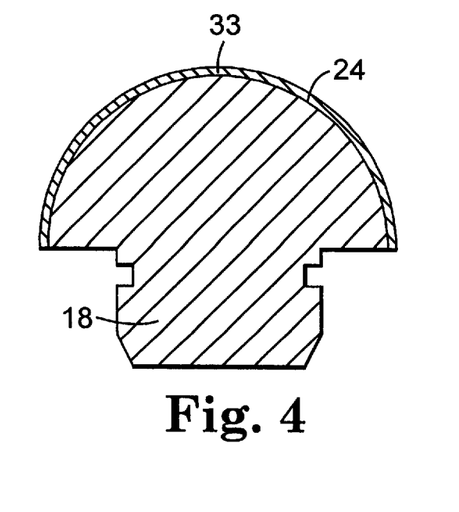
FIG. 4 is an enlarged longitudinal cross-section of the valve plug from the inverted bucket-type actuated steam valve shown in FIG. 1.
Figure 5:
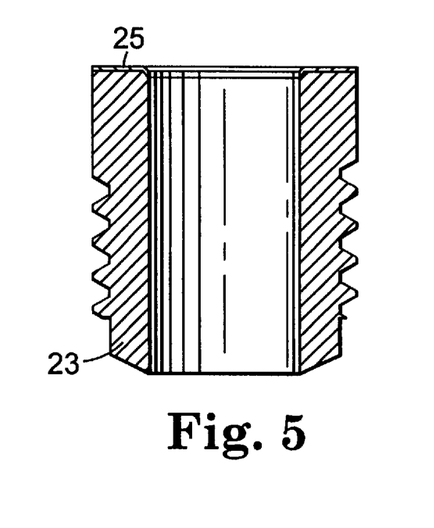
FIG. 5 is an enlarged longitudinal cross-section of the valve seat from the inverted bucket-type actuated steam valve shown in FIG. 1.

Referring now to FIGS. 3–5. Valve plug 18 is shown with metal nitride or metal carbide coating 33 covering valve plug major surface 24. Valve seat 23, which has valve seat major surface 20 and valve seat mating surface 29, is shown with a metal nitride or metal carbide coating 25 covering both valve seat major surface 20 and valve seat mating surface 29. In the present invention it is preferred that valve plug major surface 24 and at least the valve seat mating surface 29 are covered with the metal nitride or metal carbide coating. Typically, valve seat major surface 20 will also have the metal nitride or metal coating thereon due to the nature of the typical metal nitride or metal carbide coating process.

Examples of alternative embodiments of inverted bucket-type actuated steam valves which can be modified to include the metal nitride or metal carbide can be found, for example, in U.S. Pat. No. 4,149,557 (Keech et al.), U.S. Pat. No. 5,065,785 (Deacon et al.), the disclosures of which are incorporated herein by reference.

Exemplary Balanced Pressure-Type Actuated Steam Valve

Figure 6:
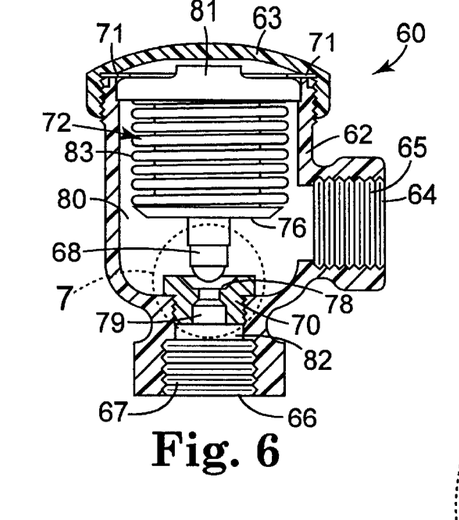
FIG. 6 is a longitudinal cross-section of a balanced pressure thermostatic-type actuated steam valve according to the present invention.
Figure 7:
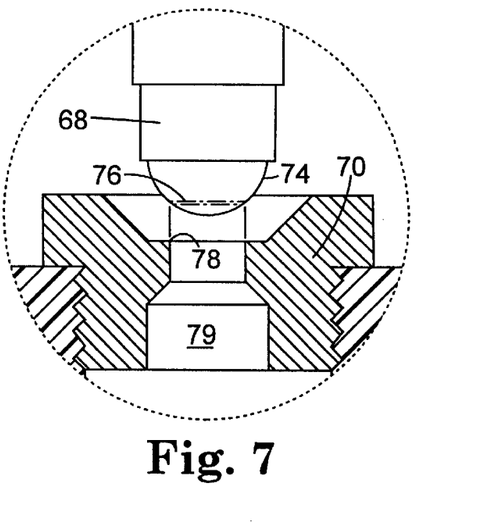
FIG. 7 is an enlarged longitudinal cross-section of a portion of the balanced pressure thermostatic-type actuated steam valve shown in FIG. 6.

Referring to FIGS. 6 and 7, an exemplary balanced pressure-type actuated steam valve according to the present invention is shown. Actuated steam valve 60 comprises casing 62, casing cap 63, valve plug 68, valve seat 70, annular gasket 71, and thermostatic element 72. Casing 62, which includes inlet 64 and outlet 66, is threaded to receive casing cap 63. Casing 62 has therein first cavity 80, which is open to inlet 64, and second cavity 82 which is open to outlet 66. Inlet 64 and outlet 66 each have threaded area 65 and 67, respectively, for connection to steam piping (not shown).

Valve plug 68 has major surface 74, which includes valve plug mating surface 76. Valve seat 70 having valve seat mating surface 78 defines valve orifice channel 79. At least one of valve plug mating surface 76 (preferably major surface 74) or valve seat mating surface 78 has thereon at least one of a metal nitride or metal carbide coating.

Thermostatic element 72, having major surface 76, comprises expandable sidewall 83 (which is preferably a corrugated metal), cover bracket 81, and a liquid filled interior chamber (not shown). The liquid is preferably an alcohol mixture having a boiling point less than that of water. Cover bracket 81 of thermostatic element 72 is held in compression between a ledge (shelf) formed in the wall section of casing 62 and annular gasket 71. Valve plug 68 is rigidly mounted on second major surface 76 and is positioned for engagement with valve seat 70.

Structure that defines the conduit comprising the first and second openings and passageway therethrough may vary from valve to valve. For steam valve 60, the passageway is from inlet 64, through cavity 80, through channel 79, through cavity 82, and then to outlet 66.

Under normal operating conditions, cavity 80 is filled with steam fluid supplied, for example, from a high pressure steam system (not shown) connected to inlet 64. During operation, steam valve 60 is in an "open" position or a "closed" position. At a low temperature, for example, when steam fluid primarily in the form of condensate enters cavity 80, steam valve 60 is in an "open" position. When steam fluid in cavity 80 is predominately in the form of high temperature water vapor or steam, valve 60 is in a "closed" position.

In an "open" position, valve plug 68 is positioned relative to valve seat 70 such that steam fluid can pass from first cavity 80 through valve orifice channel 79 into second cavity 82. Steam fluid entering second cavity 82 is discharged from valve 60 through outlet 66. In a "closed" position valve plug 68 is positioned relative to valve seat 70 such that steam fluid cannot pass from cavity 80 into cavity 82. Typically, in the "closed" position valve plug mating surface 76 is in contact with valve seat mating surface 78.

Thermostatic element 72 responds to changes in temperature of steam fluid within cavity 80. As the temperature of the steam fluid within first cavity 80 increases the temperature of the liquid within thermostatic element 72 increases. When the temperature of the liquid within thermostatic element 72 reaches its boiling temperature the pressure inside causes it to expand. Sufficient expansion of thermostatic element 72 causes valve plug 68 to move toward (and to a position relative to) seat 70 such that steam fluid cannot pass from cavity 80 into cavity 82.

Examples of alternative embodiments of balance pressure-type actuated steam valves which can be modified to include the metal nitride or metal carbide coating can be found, for example, in U.S. Pat. No. 4,295,605 (Clayton et al.) and U.S. Pat No. 4,679,727 (Alesson), the disclosures of which are incorporated herein by reference.

Exemplary Bimetallic-Type Actuated Steam Valve

Figure 8:
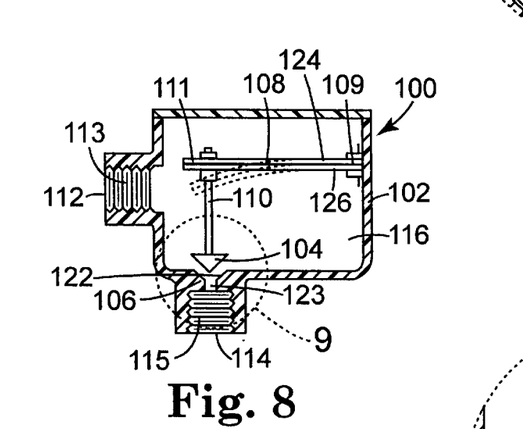
FIG. 8 is a longitudinal cross-section of a bimetallic-type actuated steam valve according to the present invention.
Figure 9:
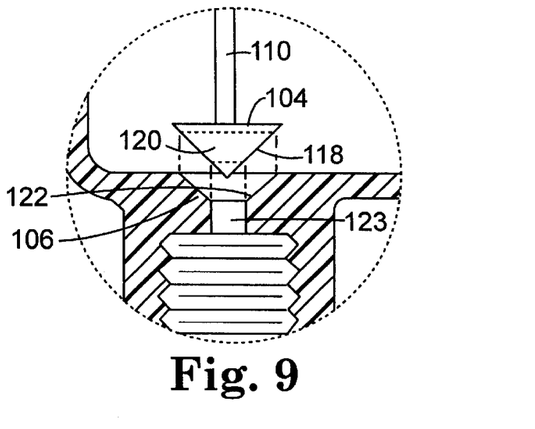
FIG. 9 is an enlarged longitudinal cross-section of a portion of the bimetallic-type actuated steam valve shown in FIG. 8.

Referring to FIGS. 8 and 9, an exemplary bimetallic-type actuated steam valve according to the present invention is shown. Actuated steam valve 100 comprises casing 102, valve plug 104, valve seat 106, bimetallic strip 108, and valve stem 110. Casing 102, has cavity 116, inlet 112 and outlet 114. Inlet 112, and outlet 114 each have threaded areas 113 and 115, respectively, for connection to steam piping (not shown).

Valve plug 104 has major surface 118, which includes valve plug mating surface 120. Valve seat 106 has valve seat mating surface 122 and valve orifice channel 123. At least one of valve plug mating surface 120 (preferably major surface 118) or valve seat mating surface 122 has at least one of a metal nitride or metal carbide coating thereon.

Bimetallic strip 108, having first end 109 and second end 111, comprises elongate first and second metal strips 124 and 126, respectively, which are bonded together. First metal strip 124 and second metal strip 126 each comprise metals having different thermal expansion characteristics. Bimetallic strip 108 responds to changes in temperature of the steam fluid in cavity 116 by changing shape (as shown) from generally linear to generally curved. The change in shape results from the different expansion characteristics of metal strips 124 and 126 making up bimetallic strip 108. At a relatively high temperature, metal strips 124 and 126 have different lengths causing bimetallic strip 108 to assume a curved shape. At relatively low temperature, metal strips 124 and 126 have substantially the same length causing bimetallic strip 108 to assume (as shown) a generally linear shape.

First end 109 of bimetallic strip 108 is rigidly mounted to valve casing 102. Valve stem 110 is rigidly mounted to bimetallic strip 108 proximate second end 111. Valve plug 104 is attached to valve stem 110 and is positioned such that when bimetallic strip 108 bends sufficiently toward valve seat 106, valve plug 104 is positioned with respect to valve seat 106 such that steam fluid cannot pass through valve orifice channel 123 (e.g., the valve is closed).

Structure that defines the conduit comprising the first and second openings and passageway therethrough may vary from valve to valve. For steam valve 100, the passageway is from inlet 112, through cavity 116, through channel 123, and then to outlet 114.

Under normal operating conditions, cavity 116 is filled with steam fluid supplied, for example, from a high pressure steam system (not shown) connected to inlet 112. During operation, steam valve 100 is in an "open" position or a "closed" position. At a low temperature, for example, when cavity 116 contains steam fluid primarily in the form of condensate, steam valve 100 is in an "open" position. In the "open" position, bimetallic strip 108 typically has a generally linear or flat shape (as shown), and valve plug 104 is spaced sufficiently away from valve seat 106 such that steam fluid in cavity 116 can pass through valve orifice channel 123 and be discharged through outlet 114.

At a higher temperature, for example, when steam fluid in cavity 116 is primarily in the form of vapor, steam valve 100 is in a "closed" position. In the "closed" position, bimetallic strip 108 typically has a generally curved shape (as shown in dotted lines) and valve plug 104 is positioned with respect to valve seat 106 (more specifically valve plug mating surface 120 is positioned with respect to valve seat mating surface 122) such that steam fluid in cavity 116 cannot pass through valve orifice channel 123. Typically, in the "closed" position valve plug mating surface 120 is in contact with valve seat mating surface 122.

Examples of alternative embodiments of bimetallic-type actuated steam valves which can be modified to include the metal nitride or metal carbide coating can be found, for example, in U.S. Pat. No. 4,723,704 (Muramoto) and U.S. Pat. No. 4,427,149 (Adachi), the disclosures of which are incorporated herein by reference.

Exemplary Thermodynamic-Type Actuated Steam Valve

Figure 10:
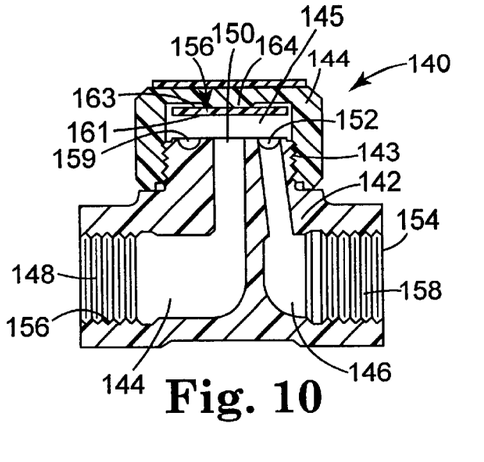
FIG. 10 is a longitudinal cross-section of a thermodynamic disc-type actuated steam valve according to the present invention.
Figure 11:
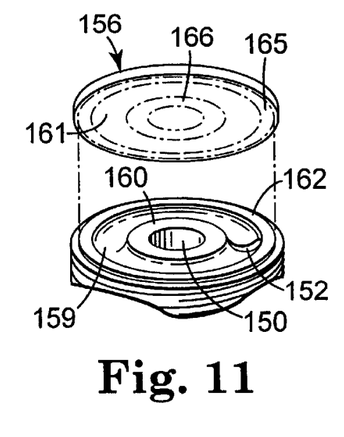
FIG. 11 is an enlarged birdseye view of a portion of the thermodynamic disc-type actuated steam valve shown in FIG. 10.

Referring to FIGS. 10 and 11, an exemplary thermodynamic-type actuated steam valve according to the present invention is shown. Actuated steam valve 140 comprises casing 142, having first cavity 144, second cavity 146, first inlet 148, first outlet 150, second inlet 152, second outlet 154, and threads 143 to receive casing cap 144. First outlet 150, and second inlet 152 are in communication with cavity 145. Further, first inlet 148 and second outlet 154 each have threaded areas 156 and 158, respectively, for connection to steam piping (not shown).

Annular groove 159 is machined into casing 142 to provide first and second annular shaped valve seats 160 and 162, respectively. Actuated steam valve 140 further includes planar free-floating valve plug 156 which has first and second major surfaces 161 and 163, respectively. First major surface 161, which has annular mating surfaces 165 and 166, is shaped such that mating surfaces 165 and 166 seat on valve seats 162 and 160, respectively, when valve 140 is in a "closed" position (i.e., mating surface 165 seats on valve seat 162, and mating surface 166 seats on valve seat 160). At least one of valve plug mating surface 165 or 166 (preferably both 165 and 166), or one of valve seat mating surfaces 160 and 162 (preferably both), has thereon at least one of a metal nitride or metal carbide coating. Most preferably, major surface 161 has thereon at least one of a metal nitride or metal carbide coating.

Structure that defines the conduit comprising the first and second openings and passageway therethrough may vary from valve to valve. For steam valve 140, the passageway is from inlet 148 through cavity 144 to first outlet 150. From outlet 150, steam fluid passes through cavity 145 to inlet 152. From inlet 152, steam fluid passes through cavity 146 exiting at outlet 154.

Under normal operating conditions, steam fluid is supplied, for example, from a high pressure steam system (not shown) connected to first inlet 148. In an "open"

position, steam fluid passing through first cavity 144 exits at first outlet 150. The flow of steam fluid from first outlet 150 causes valve plug 156 to be held against boss 164 of cap 144. In the "open" position, steam fluid exiting first outlet 150 enters second inlet 152, passes through second cavity 146, and is discharged through second outlet 154.

As the temperature of steam fluid passing through first cavity 144 increases, the static pressure on major surface 163 of valve plug 156 increases. When the static pressure on major surface 163 exceeds the dynamic pressure on major surface 161 of valve plug 156, the valve plug moves such that it is positioned with respect to valve seat mating surfaces 160 and 162 so that steam fluid cannot pass from cavity 144 to cavity 146 (i.e., the valve is closed).

Examples of alternative embodiments of thermodynamic-type actuated steam valves which can be modified to include the metal nitride or metal carbide coating can be found, for example, in U.S. Pat. No. 3,807,429 (Breton), the disclosure of which is incorporated herein by reference.

Exemplary Float and Lever-Type Actuated Steam Valve

Figure 12:
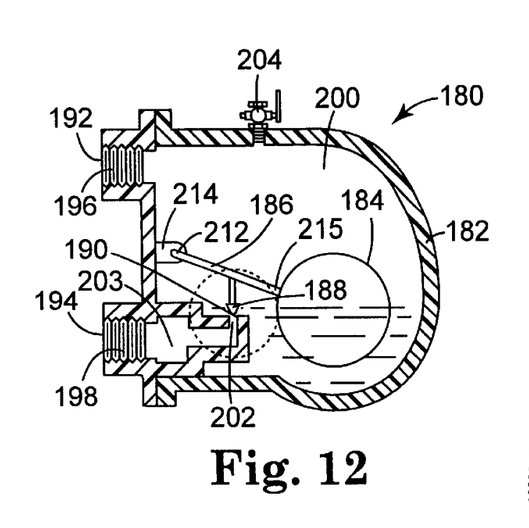
FIG. 12 is a longitudinal cross-section of a float and lever-type actuated steam valve according to the present invention.
Figure 13:
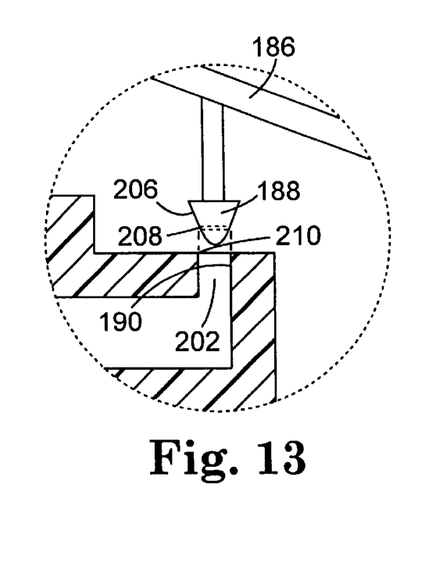
FIG. 13 is an enlarged longitudinal cross-section of a portion of the float and lever-type actuated steam valve shown in FIG. 12.

Referring to FIGS. 12 and 13, an exemplary float and lever-type actuated steam valve according to the present invention is shown. Actuated steam valve 180 comprises casing 182, float 184, float arm 186, valve plug 188, and valve seat 190. Casing 182 includes inlet 192, and outlet 194, having threaded areas 196 and 198, respectively, for connection to steam piping (not shown). Casing 182 defines first cavity 200, which is open to inlet 192, and second cavity 203, which is open to outlet 194. Valve seat 190 defines valve orifice channel 202 which connects first cavity 200 to second cavity 203. Steam valve 180 further includes manual or automatic air venting device 204 in communication with first cavity 200.

Valve plug 188 has major surface 206, which includes valve plug mating surface 208. Valve seat 190 has valve seat mating surface 210. At least one of valve plug mating surface 208 (preferably major surface 206) or valve seat mating surface 210 has thereon at least one of a metal nitride or metal carbide coating.

First end 212 of valve arm 186 is pivotably mounted to casing 182 with bracket 214. Second end 215 of valve arm 186 is rigidly mounted to float 184. Valve plug 188 is rigidly mounted between first end 212 and second end 215 of valve arm 186 such that valve plug 188 is positioned for engagement with valve seat 190.

Structure that defines the conduit comprising the first and second openings and passageway therethrough may vary from valve to valve. For steam valve 180, the passageway is from inlet 192, through cavity 200, through channel 202, through cavity 203, and then to outlet 194.

Under normal operating conditions, steam fluid is supplied, for example, from a high pressure steam system (not shown) connected to first inlet 192. Steam fluid in the form of condensate collects in the bottom of chamber 200. When the level of condensate in chamber 200 is below a predetermined level, valve 180 is in a "closed" position. In the "closed" position valve plug 188 is positioned relative to valve seat 190 such that steam fluid in cavity 200 cannot flow through valve orifice channel 202. Typically, in the "closed" position valve plug mating surface 208 is in contact with valve seat mating surface 210. As the level of condensate within cavity 200 rises, float 184, which is buoyant, rises. As float 184 rises, float lever 186 pivots on bracket 214 causing valve plug 188 to be lifted away from valve seat 190. In this "open" position condensate flows from cavity 200 through valve orifice channel 202 into cavity 203, where it is discharged from outlet 194. Discharge of condensate from valve 180 causes the level of condensate in chamber 200 to fall thereby causing valve 180 to again assume a "closed" position An example of an alternative embodiments of a float and lever-type actuated steam valve suitable for the present invention can be found, for example, in U.S. Pat. No. 4,387,773 (Balazs et al.), the disclosure of which is incorporated herein by reference.

Further additional details regarding actuated steam valves may also be found, for example, in "Steam Utilization Course," Spirax Sarco, Inc., 1985, the disclosure of which is incorporated herein by reference.

Materials suitable for making components (e.g., valve plug, valve seat) of an actuated steam valve according to the present invention are known in the art and include steel, stainless steel, cast iron, aluminum, brass, and bronze.

Steam valves according to the present invention have at least one of a metal nitride or metal carbide coating (i.e., a metal nitride coating, metal carbide coating, or combination thereof) on at least one of the valve plug mating surface or valve seat mating surface. Preferably, the coating is present on the valve plug mating surface, more preferably on the valve plug major surface. Even more preferably, the coating is present on the valve plug mating surface (most preferably the valve plug major surface) and the valve seat mating surface.

Suitable metal nitride and metal carbide coatings may include those commonly used to provide, for example, a gold color on jewelry, watches, and emblems, or logos affixed to automobiles, wherein, for example, in use the coatings are commonly exposed to water (e.g., the jewelry and watches to perspiration, and the automobile emblems or logos to rain) and have at least some durability in such environments. Preferred metal nitride and carbide coatings include coatings of TiN, CrN, ZrN, TiAlN, AlTiN, TliCN, WC, HfC, SiC, or combinations thereof. Most preferably, the metal nitride is TiN.

Suitable metal nitride and metal carbide coatings can be applied to the surfaces of the steam valve exposed to steam fluid (e.g., the valve plug mating surface, the valve plug major surface, and the valve seat mating surface) using techniques known in the metal nitride/carbide coating art. Such techniques, include chemical vapor deposition (CVD) and physical vapor deposition (PVD). Examples of suitable general PVD techniques are disclosed, for example, in U.S. Pat. No. 5,085,671 ( Martin et al.), U.S. Pat. No. 4,511,593 (Brandolf), U.S. Pat. No. 5,458,754 (Sathrum et al.), and U.S. Pat. No. 4,620,913 (Bergman), the disclosures of which are incorporated herein by reference. Examples of suitable general CVD techniques are disclosed, for example, in U.S. Pat. No. 5,378,501 (Foster et al.), the disclosure of which is incorporated herein by reference. The metal nitride or metal carbide may also be formed, for example, by direct nitriding or carbiding of a metal surface.

The desired thickness of the metal nitride and/or metal carbide coating may depend, for example, on the particular valve type or design, the materials from which the valve is made, the desired service life of the valve, and/or the environment (e.g., steam pressure, composition, or temperature) the valve is to be used in. Typically, the preferred average thickness of the coating is in the range from about 0.5 micrometer to about 100 micrometers; more preferably about 0.5 to about 20 micrometers; and most preferably about 1 to about 5 micrometers.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

The valve plug and valve seat were removed from a steam valve repair kit (referred to as "B1671-1, PCA ½ Less Bucket, 213-813A883-15 psi", and obtained from Armstrong International, Inc., Three Rivers, Mich.). The valve plug and valve seat were made of stainless steel, and had a Knoop hardness of about 481 and 721, respectively (measured using Knoop hardness tester available under the trade designation "BUELER MICROMET IV" from Bueler Instruments; 500 gram load, 15 second dwell).

A TiN coating was applied to the face of the valve seat (which included the valve seat mating surface), and to a major surface of the valve plug (which included the valve plug mating surface) using a physical vapor deposition technique (more specifically, Multi-Arc, Inc. of West St. Paul, Minn. applied a TiN coating using their physical vapor deposition technique marketed under the trade designation "ION BOND"). Multi-Arc's trade literature provides the following typical property values for TiN coatings applied using their "ION BOND" technique: hardness of 2900+/−200 (Vickers hardness at 50 gram load), adhesion of 70 N (critical normal force required to detach the coating from the substrate), and coefficient of friction of 0.65 (measured between 100 Cr6 ball and coated surface).

The steam valve repair kit was reassembled and installed into an inverted bucket steam valve (available as Model #883 from Armstrong International, Inc.) operating as part of one of the 3M Company's (located in Maplewood, Minn.) facilities steam distribution systems. The inverted bucket steam valve operated at a temperature of about 163° C. (325° F.), a pressure of about 105 kPa (15 psig), and had a valve cycle rate of about 1 to 2 Hz.

After about 76 days of service (i.e., from about Aug. 10, 1996 to about Oct. 25, 1996), the valve plug and valve seat were visually inspected and exhibited no evidence of corrosion or wear, although a slightly polished ring was observed on the valve plug corresponding to the valve plug mating surface. The steam valve was reassembled and put back into service.

After about 46 additional days of service (i.e., from about Oct. 25, 1996 to about Dec. 10, 1996), the valve plug and valve seat were again visually inspected. No evidence of corrosion and minimal wear was detected.

The valve plug mating surface was then further examined with the backscattering electron imaging mode of a scanning electron microscope (available under the trade designation "JOEL MODEL 6400" from USA Inc., Peabody, Mass.). A material other than TiN was observed to be present at the valve plug mating surface. It is believed that some of the TiN had been worn away in some areas of the mating surface, revealing the underlying valve plug material.

The valve plug and valve seat were prepared for optical and scanning electron microscope (SEM) examination. Radial-longitudinal sections were taken from the valve plug and valve seat elements using a water-cooled abrasive cut-off saw. The sections were then mounted in alumina filled castable epoxy mounting materials and were polished using conventional techniques.

The polished samples were first examined using a metallugical light microscope at 500X. Such examination revealed the presence of a thin, uniform, TiN coating on both parts.

The samples were then examined at 5000X using a scanning electron microscope (available as Model S-3200N from Hitachi Corp.) in variable pressure mode. The coating thickness of TiN on the valve plug was observed to be uniform, with no grooves or significant coating thickness variations between the mating surface and the major surface. The average thickness of the TiN coating was about 2.12 micrometers with a standard deviation of 0.14 micrometer. The TiN coating thickness on the valve seat mating surface was not uniform, having an average thickness of about 0.66 micrometer with a standard deviation of about 0.51 micrometer. The average thickness of the TiN coating on the valve seat major surface was found to be uniform, with an average thickness of about 1.49 micrometer and a standard deviation of about 0 micrometer.

Example 2

A valve plug and valve seat element were removed from a steam valve repair kit (referred to as "B1669-2 PCA 3/16 Less Bucket 800–880A—20 psi, 981— 50 psi" obtained from Armstrong International, Inc.). The valve plug and valve seat were made of stainless steel.

A TiN coating was applied to the major surface of the valve plug (which included the valve plug mating surface) using the technique described in Example 1. A very thin overspray of TiN was also applied by Multi-Arc, Inc. to the major surface of the valve plug (which included the valve plug mating surface).

The steam valve repair kit was reassembled and installed into an inverted bucket steam valve (available as Model #880 from Armstrong International, Inc.) operating as part of one of the 3M Company's (located in Maplewood, Minn.) facilities steam distribution systems. The inverted bucket steam valve operated at a temperature of about 163° C. (325° F.), a pressure of about 105 kPa (15 psig), and had a valve cycle rate of less than about 1 Hz.

After about 76 days of service (i.e., from about Aug. 10, 1996 to about Oct. 25, 1996). the valve plug and valve seat were visually inspected. A reddish ring of material was present, generally covering the mating surface of the valve plug. Further, a reddish coating was present on the major surface and mating surface of the valve seat. The reddish material was visually identified as a corrosion product. Upon visual examination, it was determined that the reddish ring of material on the valve plug was a surface deposit. The material was scraped off with a knife, revealing an uncorroded TiN surface. The reddish coating adhered to the valve seat and was not removed. The steam valve was reassembled and put back into service.

After about 46 additional days of service (i.e., from about Oct. 25, 1996 to about Dec. 10, 1996), the valve plug and valve seat were again visually inspected. A reddish coating was present on the valve plug mating surface, valve seat mating surface, and valve seat major surface. The material was scraped off of the valve plug to reveal an uncorroded, TiN coated, surface. The valve plug and valve seat were removed from service and were examined microscopically as described in Example 1.

The polished samples were first examined using a metallurgical light microscope at 500X. Such examination revealed the presence of a thin, uniform TiN coating over the valve plug major surface.

The samples were then examined at 5000X using a scanning electron microscope ("Model S-3200N") in variable pressure mode. The coating thickness of TiN on the valve plug was observed to be uniform, with no grooves or significant coating thickness variation between the mating surface and the major surface. The average thickness of the TiN coating was about 1.50 micrometer with a standard deviation of about 0 micrometer. Although the gold color of the valve seat observed by visual inspection (i.e., without a microscope) indicated the presence of TiN, no coating was observed at 5000X magnification. It is believed this was due to the relative thin nature of the coating.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A steam valve comprising:
   a conduit comprising a first opening, a second opening, and a steam fluid passageway therethrough for flow of steam fluid between said openings, said steam fluid passageway including a valve seat that includes a valve seat mating surface; and
   a valve plug including a major surface which includes a valve plug mating surface, said valve plug being moveable relative to said valve seat between at least a first position and a second position;
   wherein in said first position said mating surfaces cooperate to substantially prevent flow of steam fluid through said steam fluid passageway from said first opening to said second opening, and wherein in said second position said mating surfaces are spaced at a distance from each other to allow steam fluid to flow from said first opening to said second opening through said steam fluid passageway, and wherein said valve seat mating surface has a metal nitride coating thereon.

2. A steam valve according to claim 1 wherein said valve plug major surface has a metal nitride coating thereon.

3. A steam valve according to claim 1 wherein both said valve plug mating surface and said valve seat mating surface have a metal nitride coating thereon.

4. A steam valve according to claim 3 wherein the metal nitride of said coating is selected from the group consisting of TiN, CrN, ZrN, TiAlN, AlTiN, TiCN, and combinations thereof.

5. A steam valve according to claim 3 wherein said metal nitride coating has a thickness in the range from about 0.5 to about 100 micrometers.

6. A steam valve according to claim 3 which is a thermostatically actuated valve.

7. A steam valve according to claim 3 which is a mechanically actuated valve.

8. A steam valve according to claim 3 which is a thermodynamically actuated valve.

9. A steam valve according to claim 3 wherein the valve is selected from the group consisting of balanced pressure thermostatic valves, bimetallic valves, float and lever valves, inverted bucket valves, and thermodynamic disc valves.

10. A steam valve according to claim 3 which is an inverted bucket valve.

11. A steam valve according to claim 1 wherein said metal nitride coating is selected from the group consisting of TIN, CrN, ZrN, TiAlN, AlTiN, TiCN, and combinations thereof.

12. A steam valve according to claim 1, wherein said metal nitride coating has a thickness in the range from about 0.5 to about 100 micrometers.

13. A steam valve according to claim 1, wherein said metal nitride coating has a thickness in the range from about 0.5 to about 20 micrometers.

14. A steam valve according to claim 1, wherein said metal nitride coating is TiN having a thickness ranging from between about 0.5 to about 20 micrometers.

* * * * *

UNITED STATES PATENT AND TRADEMARK OFFICE
CERTIFICATE OF CORRECTION

PATENT NO. : 6,302,136 B1
DATED : October 16, 2001
INVENTOR(S) : Billy Lee Weaver, Michael R. Woiaka and Timothy N. Booth It is certified that error appears in the above-identified patent and that said Letters Patent is hereby corrected as shown below:

Column 1,
Line 38, "(e.g.,.," should be -- (e.g., --

Column 10,
Line 36, "TiN, CrN, ZrN, TiAlN, AlTin, TIiCN" should be -- TiN, CrN, ZrN, TiAlN, AlTiN, TiCN --

Column 14,
Line 24, "consisting of TIN" should be -- consisting of TiN --

Signed and Sealed this

Eighth Day of October, 2002

Attest:

Attesting Officer

JAMES E. ROGAN
Director of the United States Patent and Trademark Office